(12) United States Patent
Gueta et al.

(10) Patent No.: US 10,341,205 B2
(45) Date of Patent: Jul. 2, 2019

(54) SYSTEM AND METHOD FOR RECORDING WEB SESSIONS

(71) Applicant: GlassBox Ltd., Petach Tikva (IL)

(72) Inventors: Yaron Gueta, Hod Ha'Sharon (IL); Shachar Ofek, Ra'anana (IL)

(73) Assignee: GlassBox Ltd., Petach Tikva (IL)

( * ) Notice: Subject to any disclaimer, the term of this patent is extended or adjusted under 35 U.S.C. 154(b) by 213 days.

(21) Appl. No.: 15/420,926

(22) Filed: Jan. 31, 2017

(65) Prior Publication Data

US 2017/0230260 A1 Aug. 10, 2017

Related U.S. Application Data (60) Provisional application No. 62/292,881, filed on Feb. 9, 2016.

(51) Int. Cl.
*H04L 12/26* (2006.01)
*H04L 12/24* (2006.01)
*H04L 29/08* (2006.01)

(52) U.S. Cl.
CPC ............ *H04L 43/08* (2013.01); *H04L 41/046* (2013.01); *H04L 41/20* (2013.01); *H04L 67/02* (2013.01); *H04L 67/10* (2013.01); *H04L 67/142* (2013.01)

(58) Field of Classification Search
CPC ......... H04L 43/08; H04L 43/12; H04L 41/20; H04L 41/046; H04L 67/02; H04L 67/10; H04L 67/14; H04L 67/22; H04L 67/142
USPC ........................................................ 709/224
See application file for complete search history.

(56) References Cited

U.S. PATENT DOCUMENTS

| | | | | |
|---|---|---|---|---|
| 8,619,579 | B1 * | 12/2013 | Rothstein | H04L 43/026 370/235 |
| 9,331,915 | B1 * | 5/2016 | Brandwine | H04L 43/04 |
| 9,774,517 | B2 * | 9/2017 | Wittenstein | H04L 43/12 |
| 10,015,205 | B1 * | 7/2018 | Cohen | H04L 67/10 |
| 2003/0145071 | A1 * | 7/2003 | Straut | G06F 11/3438 709/223 |
| 2004/0100507 | A1 * | 5/2004 | Hayner | G06F 9/451 715/855 |
| 2012/0233311 | A1 * | 9/2012 | Parker | H04L 43/00 709/224 |
| 2016/0182336 | A1 * | 6/2016 | Doctor | H04L 43/062 709/224 |

\* cited by examiner

*Primary Examiner* — Ruolei Zong (57) ABSTRACT

A web session recording system comprising at least one server, the server comprising one or more network cards and at least one processing unit configured to: monitor one or more ports of the network cards, the ports being used for conducting a plurality of web sessions; and send web session recording enabling data relating to the web sessions to a data repository, for recording the web sessions; wherein the monitor and the send enable recording the web sessions without access to resources external to the server.

25 Claims, 4 Drawing Sheets

SYSTEM AND METHOD FOR RECORDING WEB SESSIONS

CROSS-REFERENCE TO RELATED APPLICATIONS

This application claims priority to U.S. Provisional Application No. 62/292,881 filed on Feb. 9, 2016, which is incorporated herein by reference in its entirety.

TECHNICAL FIELD

The invention relates to a system and method for recording web sessions for various purposes.

BACKGROUND

Various systems enable recordation of web sessions for various purposes. Such systems usually utilize port mirroring/span ports, network taps or any other network device that enables packet duplication, for transmitting the packets of the web sessions to be recorded to a data storage system for storage. Utilization of port mirroring or span ports can be performed when the operator of the web session recording systems has direct, or indirect, access to the network switch through which the web session packets to be recorded pass (as the switch needs to be configured to send the packets of the web sessions to be recorded to the web session recording system). Similarly, installation of a network tap (or any other network device that enables packet duplication in a similar manner) can be performed when the operator of the web session recording systems has direct, or indirect, access to the network through which the web session packets to be recorded pass (as the network tap needs to be installed on that network). However, in many cases, the operator of the web session recording systems has no access (neither direct nor indirect) to the network or the switch (or any other network device that enables packet duplication such as a network tap, a load balancer, etc.) through which the web session packets to be recorded pass.

Nowadays, many companies utilize cloud computing services, in which they can have a certain entity (such as Amazon, Google, Microsoft, Rackspace and others) allocate them with various hardware resources (such as servers, network resources, etc.) while such hardware resources are hosted at a site that is under the control of the entity that is allocating the hardware resources to the company that utilizes the cloud computing services. In many cases, a company can have its web server installed on such hardware resources that have been allocated to it. In such cases, recordation of the web sessions, conducted on a website hosted by such web server, by port mirroring or using a network tap, may be impossible.

There is thus a need in the art for a new method and system for recording web sessions.

GENERAL DESCRIPTION

In accordance with a first aspect of the presently disclosed subject matter there is provided a web session recording system comprising at least one server, the server comprising one or more network cards and at least one processing unit configured to: monitor one or more ports of the network cards, the ports being used for conducting a plurality of web sessions; and send web session recording enabling data relating to the web sessions to a web session recording server for storing the data in a data repository thereby enabling recording the web sessions; wherein the monitor and the send enable recording the web sessions without manipulating hardware resources external to the server.

In some cases the web session recording enabling data comprises a segment of data including at least payloads of one or more packets relating to the web sessions passing through the ports, or data enabling reconstructing the segment.

In some cases the system further comprises a hash repository storing hashes of sent segments of data, each including at least payloads of one or more packets relating to the web session passing through the ports; and the processing unit is further configured to activate a hash function on a segment of data including at least payloads of one or more packets relating to the web session passing through the ports, giving rise to segment hash; and wherein if the segment hash is not comprised within the hash repository the web session recording enabling data includes the segment of data, and if the segment hash is comprised within the hash repository the web session recording enabling data is data enabling reconstructing the segment, wherein the data enabling reconstructing the segment is of smaller size than the segment of data.

In some cases the data enabling reconstructing the segment is the segment hash.

In some cases the segment of data includes at least payloads of a sequence of packets relating to a given Hypertext Transfer Protocol (HTTP) connection.

In some cases the processing resource is further configured to continuously repeat the monitor and the send.

In some cases the monitor and the send are performed by an agent installed on the server.

In some cases the web session recording server and the server are different servers.

In some cases the web session recording server and the server are a single server.

In some cases at least two web sessions of the plurality of web sessions are conducted simultaneously.

In some cases at least a first web session of the plurality of web sessions is initiated by a first user and at least a second web session of the plurality of web sessions is initiated by a second user, different than the first user.

In some cases the first web session and the second web session are conducted simultaneously.

In accordance with a second aspect of the presently disclosed subject matter there is provided a method of recording web sessions, the method comprising: monitoring, by a processor, one or more ports of one or more network cards comprised within a server, the ports being used for conducting a plurality of web sessions; and sending web session recording enabling data relating to the web sessions to a web session recording server for storing the data in a data repository thereby enabling recording the web sessions; wherein the monitoring and the sending enable recording the web sessions without manipulating hardware resources external to the server.

In some cases the web session recording enabling data comprises a segment of data including at least payloads of one or more packets relating to the web sessions passing through the ports, or data enabling reconstructing the segment.

In some cases the method further comprises: providing a hash repository storing hashes of sent segments of data, each including at least payloads of one or more packets relating to the web session passing through the ports; and activating a hash function on a segment of data including at least payloads of one or more packets relating to the web session passing through the ports, giving rise to segment hash; wherein if the segment hash is not comprised within the hash repository the web session recording enabling data includes the segment of data, and if the segment hash is comprised within the hash repository the web session recording enabling data is data enabling reconstructing the segment, wherein the data enabling reconstructing the segment is of smaller size than the segment of data.

In some cases the data enabling reconstructing the segment is the segment hash.

In some cases the segment of data includes at least payloads of a sequence of packets relating to a given Hypertext Transfer Protocol (HTTP) connection.

In some cases the method further comprises continuously repeating the monitoring and the sending.

In some cases the monitoring and the sending are performed by an agent installed on the server.

In some cases the web session recording server and the server are different servers.

In some cases the web session recording server and the server are a single server.

In some cases at least two web sessions of the plurality of web sessions are conducted simultaneously.

In some cases at least a first web session of the plurality of web sessions is initiated by a first user and at least a second web session of the plurality of web sessions is initiated by a second user, different than the first user.

In some cases the first web session and the second web session are conducted simultaneously.

In accordance with a third aspect of the presently disclosed subject matter there is provided a non-transitory computer readable storage medium having computer readable program code embodied therewith, the computer readable program code, executable by at least one processor of a computer to perform a method comprising: monitoring one or more ports of one or more network cards comprised within a server, the ports being used for conducting a plurality of web sessions; and sending web session recording enabling data relating to the web sessions to a web session recording server for storing the data in a data repository thereby enabling recording the web sessions; wherein the monitoring and the sending enable recording the web sessions without manipulating hardware resources external to the server.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

In the drawings and descriptions set forth, identical reference numerals indicate those components that are common to different embodiments or configurations.

Unless specifically stated otherwise, as apparent from the following discussions, it is appreciated that throughout the specification discussions utilizing terms such as "monitoring", "sending", "enabling", "activating", "repeating" or the like, include action and/or processes of a computer that manipulate and/or transform data into other data, said data represented as physical quantities, e.g. such as electronic quantities, and/or said data representing the physical objects. The terms "computer", "processor", and "controller" should be expansively construed to cover any kind of electronic device with data processing capabilities, including, by way of non-limiting example, a personal computer, a server, a computing system, a communication device, a processor (e.g. digital signal processor (DSP), a microcontroller, a field programmable gate array (FPGA), an application specific integrated circuit (ASIC), etc.), any other electronic computing device, and or any combination thereof.

The operations in accordance with the teachings herein may be performed by a computer specially constructed for the desired purposes or by a general purpose computer specially configured for the desired purpose by a computer program stored in a non-transitory computer readable storage medium. The term "non-transitory" is used herein to exclude transitory, propagating signals, but to otherwise include any volatile or non-volatile computer memory technology suitable to the application.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable sub-combination.

Figure 1:
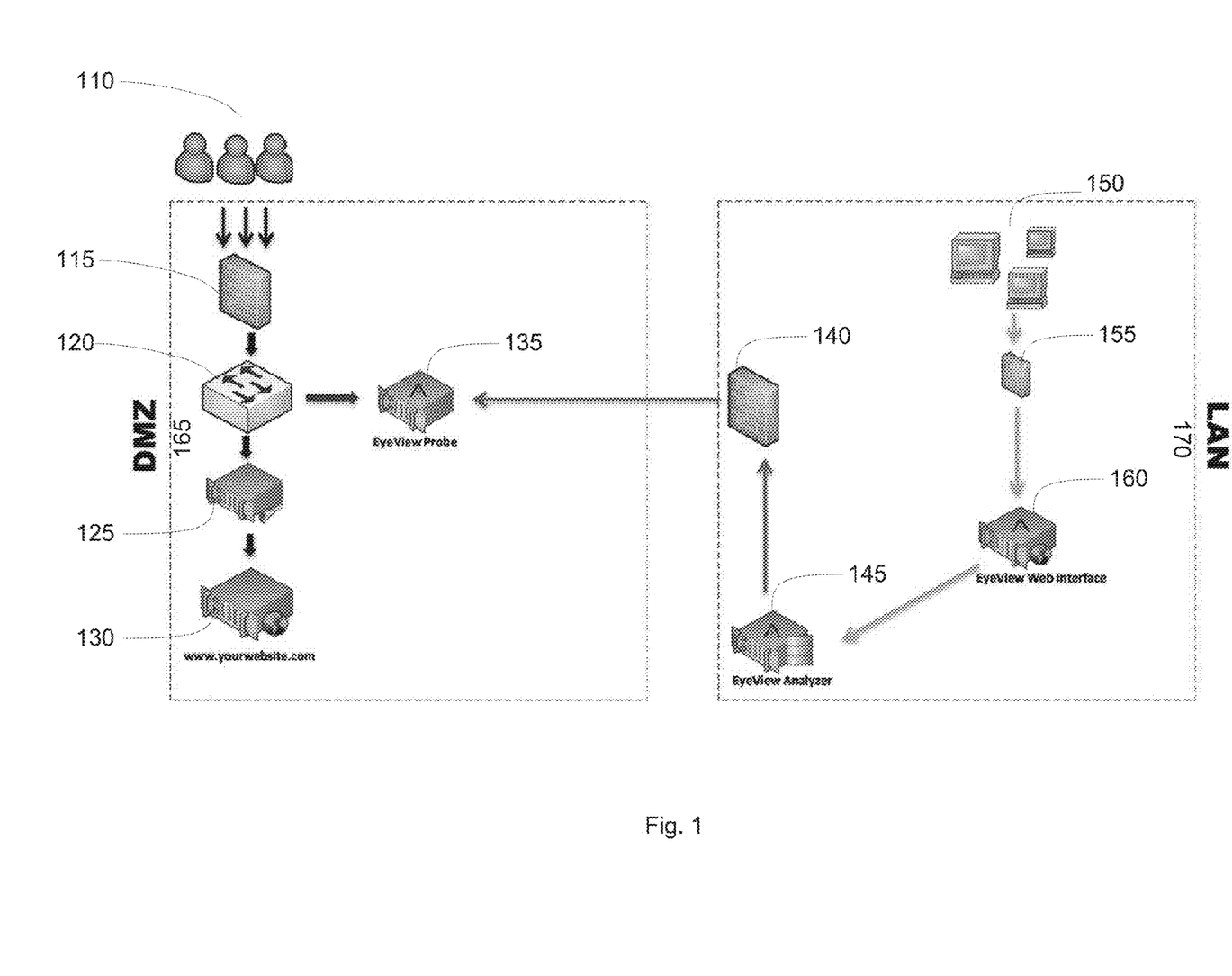
FIG. 1 shows a schematic illustration of a system for recording web sessions and its environment, in accordance with the prior art.
Figure 2:
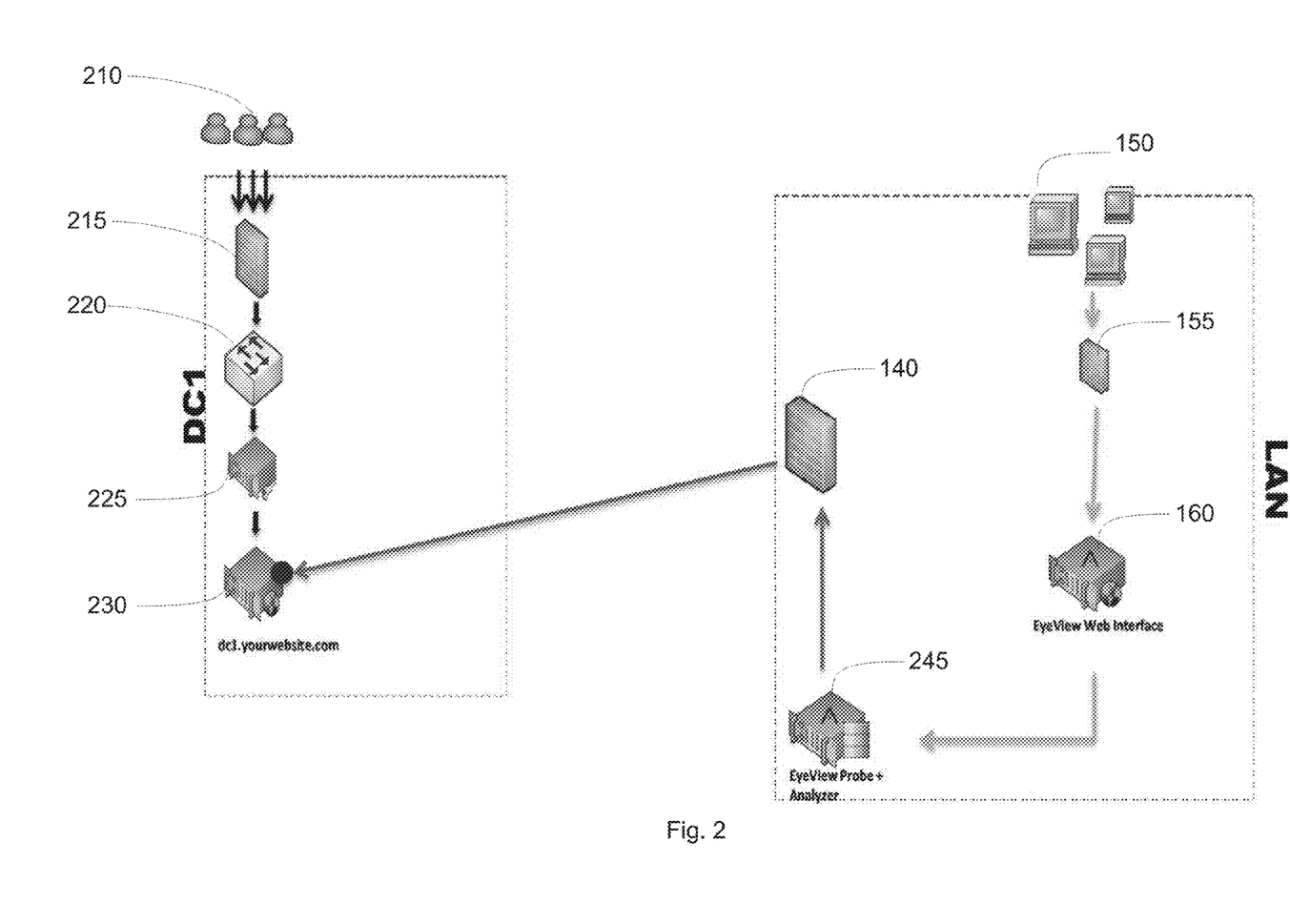
FIG. 2 shows a schematic illustration of a system for recording web sessions and its environment, in accordance with the presently disclosed subject matter.
Figure 3:
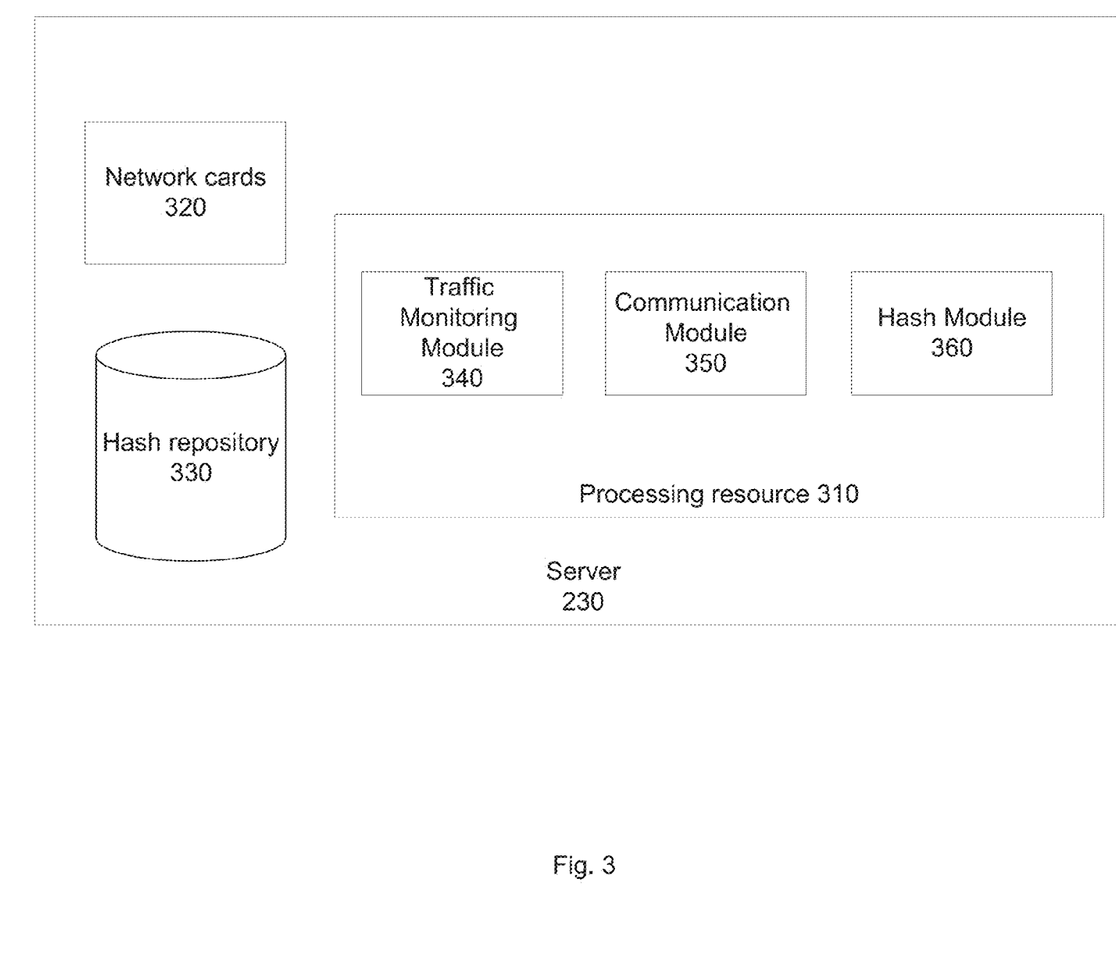
FIG. 3 is a block diagram of a web server in a system for recording web sessions, in accordance with the presently disclosed subject matter.
Figure 4:
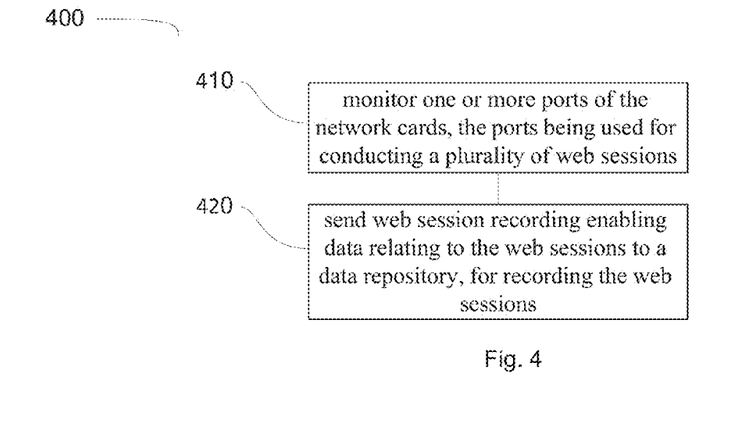
FIG. 4 is a flowchart illustrating one example of a sequence of operations carried out for recording web sessions, in accordance with the presently disclosed subject matter.
Figure 5:
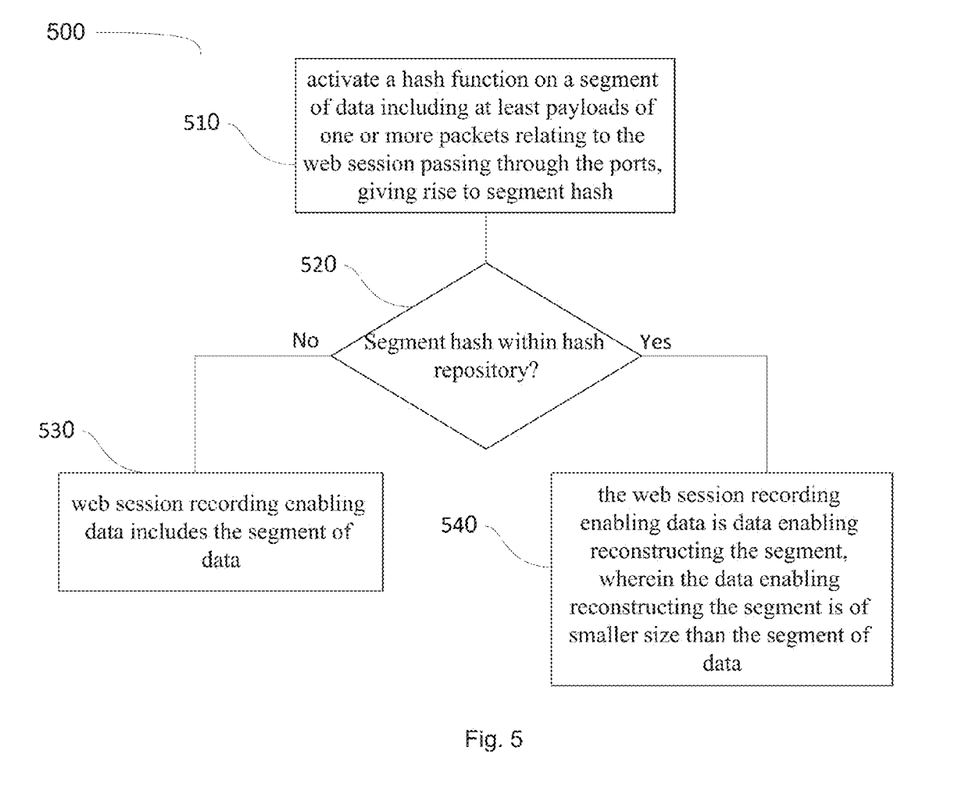
FIG. 5 is a flowchart illustrating one example of a sequence of operations carried out for de-duplicating web sessions data, in accordance with the presently disclosed subject matter.

In embodiments of the presently disclosed subject matter, fewer, more and/or different stages than those shown in FIGS. 4 and 5 may be executed. In embodiments of the presently disclosed subject matter one or more stages illustrated in FIGS. 4 and 5 may be executed in a different order and/or one or more groups of stages may be executed simultaneously. FIGS. 1-3 illustrate a general schematic of the system architecture in accordance with an embodiment of the presently disclosed subject matter. Each module in FIG. 3 can be made up of any combination of software, hardware and/or firmware that performs the functions as defined and explained herein. The modules in FIG. 3 may be centralized in one location or dispersed over more than one location. In other embodiments of the presently disclosed subject matter, the system may comprise fewer, more, and/or different modules than those shown in FIG. 3.

Bearing this in mind, attention is drawn to FIG. 1, showing a schematic illustration of a system for recording web sessions and its environment, in accordance with the prior art.

According to certain examples of the prior art, one or more users 110 can each conduct one or more web sessions, optionally simultaneously, during which they interact (using http requests/responses) with one or more web pages of a website hosted on a web server 130. The web server 130 may be connected to a Demilitarized Zone (DMZ 165), physically and/or logically separate from a trusted area of a Local Area Network (LAN 170). It is to be noted that in such cases the users 110 are not connected to LAN 170 but they can conduct the web sessions by connecting to the web server 130 via the DMZ 165, for example through an internet connection. In some cases, the separation of the DMZ 165 from the LAN 170 can include at least a firewall 140 for controlling the incoming and/or outgoing network traffic (including the network packets associated with the web sessions http requests/responses) between the DMZ 165 and the LAN 170.

In some cases, the DMZ 165 can include a firewall 115 for controlling the incoming and/or outgoing network traffic (including the network packets associated with the web sessions http requests/responses) between the users 110 and the web server 130.

Still further in accordance with some examples of the prior art, the incoming traffic (including the network packets associated with the web sessions http requests/responses) can be routed to its destination using a network switch 120 (It is to be noted that when reference is made in the description to a network switch, it includes also any other network device that enables packet duplication such as a network tap, a load balancer, etc.). As the DMZ 165 is accessible to the operator of the web server 130, the network switch 120 can be configured to duplicate at least the network packets associated with the web sessions conducted by the users 110 (which form the http requests/responses associated with the web sessions) and send them to a probe 135.

In some cases the probe 135 can be a software module installed on a server (optionally located at the DMZ 165) and it can be configured to transform those network packets of the http requests/responses associated with the web sessions to http requests/responses, e.g. using known methods and/or techniques (as an example the methods or/and technics employed by Wireshark™). It is to be noted that the probe's 135 server can be connected to the DMZ 165 (as shown in the illustration), however in other cases it can be connected to the LAN 170 directly (and in some cases, the entire system can operate on the LAN 170 and no DMZ 165 exists) and perform its operation in the LAN 170 (in such cases, the network packets can be sent from the network switch 120 to probe's 135 server that is connected to the LAN 170, optionally via the LAN's 170 firewall 140 (if such firewall 140 exists).

The network switch 120 can be further configured to send at least the network packets associated with the web sessions conducted by the users 110 (which form the http requests/responses associated with the web sessions) also to the web server 130 itself, for conducting the web sessions.

In some cases, when an SSL off-loader 125 exists, for off-loading the SSL encryption/decryption from the web server 130, the network switch 120 can be configured to send at least the network packets associated with the web sessions conducted by the users 110 (which form the http requests/responses associated with the web sessions) to the SSL off-loader 125 instead of the web server 130, and the SSL off-loader 125 can process the SSL encryption/decryption and send the encrypted/decrypted data to the web server 130.

It is to be noted that in some cases the web server 130, the network switch 120 and the SSL off-loader's 125 server, may be connected directly to LAN 170 and not be separated therefrom by a DMZ 165. In such cases, the users 110 can conduct the web sessions by connecting to the web server 130 connected to the LAN 170 through an internet connection.

Returning to the probe 135, the probe 135 can be further configured to send the http requests/responses to an analyzer 145 (optionally the network traffic containing the http requests/responses passes through the firewall 140). The analyzer can be can be a software module installed on a server, and it can be configured to associate each http request/response with a unique identifier of the session with which the http request/response is associated (e.g. utilizing known methods and/or techniques) and store the data (including the http requests/responses and the web session identifier of the web session with which the http requests/responses is associated) in a data repository (e.g. a data storage system) so that each web session is recorded and can be later on replayed in various manners (e.g. a playback an entire web session). In some cases, the analyzer 145 can be further configured to index the stored data. e.g. in a way that each session can be found by looking for any given string in the http requests/responses of the recorded web sessions.

When a user 150 of the web recording system requests to view a recorded web session, he can send (optionally through a firewall 155) a request, including a web session identifier, to a playback web interface 160 (that is a software module installed on a server). The playback web interface 160 can be configured to retrieve the requested web interface http requests/responses from the data repository and provide the user 150 of the web recording system with a playback of the requested web session utilizing the retrieved http requests/responses.

Turning to FIG. 2 there is shown a schematic illustration of a system for recording web sessions and its environment, in accordance with the presently disclosed subject matter.

According to certain examples of the presently disclosed subject matter, one or more users 210 can each conduct one or more web sessions during which they interact (using http requests/responses) with one or more web pages of a website hosted on one or more web servers 230. In some cases, the web session can be conducted simultaneously by a plurality of users.

The web server 230 may be located at a site DC controlled by an entity that provides cloud computing services (also referred to herein as cloud computing service provider). The cloud computing service provider can allocate various hardware resources (such as servers, network, etc.) located at DC1, to other entities that do not control, and usually do not have access to, the physical site DC1. Such other entities cannot configure the network switch 220 and cannot install a network tap in DC1 so that recording web sessions conducted between the users and the entities websites using port mirroring and/or a network tap may be impossible.

It is to be noted that the users 210 can conduct the web sessions by connecting to the web server 230 that is located at DC1, for example through an internet connection. In some cases, a firewall 140 can control the incoming and/or outgoing network traffic (including the network packets associated with the web sessions http requests/responses) between the site DC1 and the LAN 170.

In some cases, the site DC can include a firewall 215 for controlling the incoming and/or outgoing network traffic (including the network packets associated with the web sessions http requests/responses) between the users 210 and the web server 230. In some cases various additional hardware and/or software components can exist on the path between the users 210 and the web servers 230 (E.g. web application firewall, load balancer, SSL off loader, etc.).

Still further in accordance with some examples of the presently disclosed subject matter, the incoming traffic (including the network packets associated with the web sessions http requests/responses) can be routed to its destination using a network switch 220. As the site DC1 is inaccessible to the operator of the web server 230, the network switch 120 cannot be configured to duplicate network packets associated with the web sessions conducted by the users 210 (which form the http requests/responses associated with the web sessions) and send them to a probe 135. In such cases, the network switch 120 sends at least the network packets associated with the web sessions conducted by the users 210 (which form the http requests/responses associated with the web sessions) to the web server 230 itself, for conducting the web sessions.

In some cases, when an SSL off-loader 225 exists, for off-loading the SSL encryption/decryption from the web server 230, the network switch 220 can be configured to send at least the network packets associated with the web sessions conducted by the users 210 (which form the http requests/responses associated with the web sessions) to the SSL off-loader 225 instead of the web server 230, and the SSL off-loader 225 can process the SSL encryption/decryption and send the encrypted/decrypted data to the web server 230.

In accordance with the presently disclosed subject matter, the web server 230 can include software (e.g. as further detailed with respect to FIG. 3) configured to duplicate at least the network packets associated with the web sessions conducted by the users 210 (which form the http requests/responses associated with the web sessions) and send them to a probe and analyzer 245. In some cases, the probe and analyzer 245 can be software modules installed on a server (also referred to herein as web session recording server). It is to be noted that in some cases the probe and analyzer 245 can be installed on a web session recording server connected to LAN 170 (and in such cases, optionally, the network traffic containing the http requests/responses can pass through the LAN's 170 firewall 140, if such exists), however in some cases, the probe and analyzer 245 can be installed on a web session recording server located at and connected to DC1 (and in such cases the web session recording server can be the web server 230). It is to be further noted that in some cases, the probe and analyzer 245 can be two separate components, namely a probe and an analyzer, and each component can be installed on separate servers (not shown) comprising the web session recording server, located at LAN 170 or at site DC1.

It is to be still further noted that various deduplication techniques can be utilized for reducing bandwidth consumption between the web server 230 and the LAN 170, for example as detailed herein with respect to FIG. 5.

In some cases the probe and analyzer 245 can be configured to transform those network packets of the http requests/responses associated with the web sessions to http requests/responses, e.g. using known methods and/or techniques.

In addition, the probe and analyzer 245 can be further configured to associate each http request/response with a unique identifier of the session with which the http request/response is associated (e.g. utilizing known methods and/or techniques) and store the data (including the http requests/responses and the web session identifier of the web session with which the http requests/responses is associated) in a data repository (e.g. a data storage system) so that each web session is recorded and can be later on replayed in various manners (e.g. a playback an entire web session). In some cases, the probe and analyzer 245 can be further configured to index the stored data. e.g. in a way that each session can be found by looking for any given string in the http requests/responses of the recorded web sessions.

When a user 150 of the web recording system requests to view a recorded web session, he can send a request, including a web session identifier, to a playback web interface 160 (optionally through a firewall 155). The playback web interface 160 can be configured to retrieve the requested web interface http requests/responses from the data repository and provide the user 150 of the web recording system with a playback of the requested web session utilizing the retrieved http requests/responses. It is to be noted that the playback web interface 160 can be installed on a server located at LAN 170, however it can alternatively be located at site DC1.

FIG. 3 is a block diagram of a web server in a system for recording web sessions, in accordance with the presently disclosed subject matter.

According to certain examples of the presently disclosed subject matter, web server can comprise one or more network cards 320 connecting the web server to one or more computer networks and enabling it to send and receive data sent thereto through such computer networks, including http requests/responses associated with web sessions conducted by users 230 as detailed herein.

Web server 230 can further comprise, or be otherwise associated with, a hash repository 330, hash repository 330 (e.g. a database, a storage system, a memory including Read Only Memory—ROM, Random Access Memory—RAM, or any other type of memory, etc.) can be configured to store data, including inter alia hashes of segments of data that have been sent (directly or indirectly) to the probe and analyzer 245, the segments of data including at least payloads of one or more packets relating to web session passing through monitored ports of the network cards.

In some cases, hash repository 330 can be further configured to enable retrieval, update and deletion of the stored data. In some cases, hash repository 330 can be distributed between two or more geographical locations. In some cases, additionally or alternatively, hash repository 330 can be distributed between a plurality of servers (e.g. servers operatively connected over one or more computer networks).

Web server 230 further comprises one or more processing resources 310. Processing resource 310 can be one or more processing units, microprocessors, microcontrollers or any other computing devices or modules, including multiple and/or parallel and/or distributed processing units, which are adapted to independently or cooperatively process data for controlling relevant system resources and for enabling operations related to system resources.

The processing resource 310 can comprise one or more of the following modules: traffic monitoring module 340, communication module 350 and hash module 360.

According to some examples of the presently disclosed subject matter, traffic monitoring module 340 can be configured to monitor one or more ports of the network cards 320 to check if any network packets associated with http requests/responses associated with the web sessions to be recorded pass through the monitored ports.

According to some examples of the presently disclosed subject matter, communication module 350 can be configured to send the network packets associated with http requests/responses detected by the traffic monitoring module 340 to the probe and analyzer 245 for further processing as detailed herein. In some cases the communication module 350 can be further configured to handle deduplication of the sent segments of data, as further detailed herein, inter alia with respect to FIG. 5.

According to some examples of the presently disclosed subject matter, hash module 360 can be configured to calculate hashes for segments of data, as further detailed herein, inter alia with respect to FIG. 5.

Attention is now drawn to FIG. 4, showing a flowchart illustrating one example of a sequence of operations carried out for recording web sessions, in accordance with the presently disclosed subject matter.

According to some examples of the presently disclosed subject matter, web server 230 can be configured to perform a web session recording process 400. In some cases, the web server 230 can be configured to monitor (e.g. utilizing traffic monitoring module 340) one or more ports of the network cards 320 (block 410). In some cases, the monitored ports are the ports that are used by users 210 for conducting one or more web sessions during which they interact (using http requests/responses) with one or more web pages of a website hosted on the web server 230. In some cases, the web sessions can be conducted simultaneously by a plurality of users, using a plurality of ports in parallel. It is to be noted that in some cases, hundreds of thousands (and in some cases even millions) of web sessions can be conducted simultaneously. It is to be further noted, as indicated with respect to FIG. 2, that web server 230 is located at site DC1.

In some cases, web server 230 can be further configured to send (e.g. utilizing communication module 350) web session recording enabling data relating to the web sessions to a web session recording server for storing the data in a data repository (e.g. a data storage system) on which the web session recording server can store data, thereby enabling recording the web sessions (block 420). In some cases, the web session recording server can be connected to LAN 170 as indicated with respect to FIG. 2.

It is to be noted that sending the web session recording enabling data can be performed utilizing Transmission Control Protocol (TCP) connections. In some cases, the TCP connections can be established by the web server 230, however in other cases, the TCP connections are established by the probe and analyzer 245 (for example when firewall 140 prevents entities external to LAN 170 to establish TCP connections with entities connected to LAN 170 such as probe and analyzer 245). In some cases, multiple TCP connections are established. In some cases, various mechanisms can be used for guarantee delivery of the web session recording enabling data transmitted using the TCP connections. For this purpose, in case a disconnection occurs during transmittal of the web session recording enabling data, the web session recording enabling data can be stored on a persistent memory (e.g. a local disc), along with information that enables identifying the order of the packets comprising the web session recovering enabling data, and when the connection is re-established it can be transmitted, in an ordered manner, from the point the connection was lost to guarantee delivery of the web-session recording enabling data.

The web session recording enabling data can comprise one or more segments of data, each including at least payloads of one or more packets relating to the web sessions passing through the ports. In some cases, each web session recording enabling data can comprise one or more segments of data, each including one or more full packets relating to the web sessions passing through the ports. In some cases, the web session recording enabling data can comprise one or more segments of data, together including at least the payloads of all packets relating to the web sessions passing through the ports. In some cases, the web session recording enabling data can comprise one or more segments of data, together including all full packets relating to the web sessions passing through the ports. In some cases, each segment of data can include at least payloads of a sequence of packets relating to a corresponding Hypertext Transfer Protocol (HTTP) connection established between the users 210 and the web server 230.

In some cases various deduplication algorithms and/or techniques can be utilized. Attention is drawn in this respect to FIG. 5 showing a flowchart illustrating one example of a sequence of operations carried out for de-duplicating web sessions recording enabling data, in accordance with the presently disclosed subject matter.

According to some examples of the presently disclosed subject matter, web server 230 can be configured to perform a deduplication process 500. In some cases, the web server 230 can be configured to activate (e.g. utilizing hash module 360) a hash function on a segment of data including at least payloads of one or more network packets relating to the web sessions passing through the monitored ports, giving rise to a segment hash corresponding to the segment of data (block 510).

As indicated herein, The web server 230 can comprise, or be otherwise associated with, a hash repository 330 including inter alia hashes of segments of data that have been previously sent (directly or indirectly) to the probe and analyzer 245. The web server 230 can be configured to check if the segment hash is comprised within the hash repository 330, thus indicating that a segment of data with the same segment hash has been previously sent (directly or indirectly) to the probe and analyzer 245 (block 520).

It is to be noted that the hash function utilized for generating the segment hashes will result in identical segment hashes for identical segments of data, therefore, if the segment hash is found in the hash repository 330, the web session recording enabling data sent by the web server in block 420 can comprise the segment hash instead of the corresponding segment of data. The segment hash is data enabling reconstructing the corresponding segment of data, as the probe and analyzer 245 (or another entity for that purpose) can calculate/retrieve/obtain the corresponding segment of data utilizing the segment hash using various methods and/or techniques. It is to be noted that the data enabling reconstruction of the corresponding segment of data (e.g. the segment hash) is smaller than the segment of data itself.

In case no segment hash corresponding to the segment of data is found in hash repository 330, the web session recording enabling data sent by the web server in block 420 can comprise the segment of data itself.

Returning to FIG. 4, it is to be noted that the web server 230 can be configured continuously repeat the monitoring (block 410) and the sending (block 420). In some cases, the monitoring (block 410) and the sending (block 420) are repeated at least until web session recording enabling data relating to a full given web session is sent, so that the given web session can be replayed by a web recording system user 150. It is to be further noted that in some cases at least two web sessions are conducted simultaneously and the monitoring (block 410) and the sending (block 420) are repeated at least until web session recording enabling data relating to the full two web sessions are sent, so that the two web session can be replayed by a web recording system user 150. In some cases, at least a first web session of the two web sessions is initiated by a first user and at least a second web session of the two web sessions is initiated by a second user, different than the first user.

It is to be still further noted that performing the monitoring (block 410) and the sending (block 420) enable recording the web sessions without manipulating hardware resources external to the web server 230.

In some cases the monitoring (block 410) and the sending (block 420) can be performed by an agent installed on the server.

It is to be noted that, with reference to FIGS. 4 and 5, some of the blocks can be integrated into a consolidated block or can be broken down to a few blocks and/or other blocks may be added. It should be also noted that whilst the flow diagram is described also with reference to the system elements that realizes them, this is by no means binding, and the blocks can be performed by elements other than those described herein.

It is to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

It will also be understood that the system according to the presently disclosed subject matter can be implemented, at least partly, as a suitably programmed computer. Likewise, the presently disclosed subject matter contemplates a computer program being readable by a computer for executing the disclosed method. The presently disclosed subject matter further contemplates a machine-readable memory tangibly embodying a program of instructions executable by the machine for executing the disclosed method.

The invention claimed is:

1. A web session recording system comprising at least one web-server, the web-server comprising one or more network cards and at least one processing unit configured to:
   (a) monitor one or more ports of the network cards, the ports being used for conducting a plurality of web sessions comprised of one or more packets having a destination address designating the web-server; and
   (b) send web session recording enabling data based on the packets to a web session recording server for storing the data in a data repository thereby enabling recording the web sessions;
   wherein (a) and (b) enable recording the web sessions without manipulating hardware resources external to the web-server.

2. The web session recording system of claim 1 wherein the web session recording enabling data comprises a segment of data including at least payloads of the one or more packets relating to the web sessions passing through the ports, or data enabling reconstructing the segment.

3. The web session recording system of claim 1 further comprising a hash repository storing hashes of sent segments of data, each including at least payloads of the one or more packets relating to the web session passing through the ports;
   wherein the processing unit is further configured to activate a hash function on a segment of data including at least payloads of the one or more packets relating to the web session passing through the ports, giving rise to segment hash; and
   wherein if the segment hash is not comprised within the hash repository the web session recording enabling data includes the segment of data, and if the segment hash is comprised within the hash repository the web session recording enabling data is data enabling reconstructing the segment, wherein the data enabling reconstructing the segment is of smaller size than the segment of data.

4. The web session recording system of claim 3 wherein the data enabling reconstructing the segment is the segment hash.

5. The web session recording system of claim 3 wherein the segment of data includes at least payloads of a sequence of packets relating to a given Hypertext Transfer Protocol (HTTP) connection.

6. The web session recording system of claim 1 wherein the processing resource is further configured to continuously repeat (a) and (b).

7. The web session recording system of claim 1 wherein (a) and (b) are performed by an agent installed on the web-server.

8. The web session recording system of claim 1 wherein the web session recording server and the web-server are different servers.

9. The web session recording system of claim 1 wherein the web session recording server and the web-server are a single server.

10. The web session recording system of claim 1 wherein at least two web sessions of the plurality of web sessions are conducted simultaneously.

11. The web session recording system of claim 1 wherein at least a first web session of the plurality of web sessions is initiated by a first user and at least a second web session of the plurality of web sessions is initiated by a second user, different than the first user.

12. The web session recording system of claim 11 wherein the first web session and the second web session are conducted simultaneously.

13. A method of recording web sessions, the method comprising:
   (a) monitoring, by a processor, one or more ports of one or more network cards comprised within a web-server, the ports being used for conducting a plurality of web sessions comprised of one or more packets having a destination address designating the web-server; and (b) sending web session recording enabling data based on the packets to a web session recording server for storing the data in a data repository thereby enabling recording the web sessions;

wherein (a) and (b) enable recording the web sessions without manipulating hardware resources external to the web-server.

14. The method of claim 13 wherein the web session recording enabling data comprises a segment of data including at least payloads of the one or more packets relating to the web sessions passing through the ports, or data enabling reconstructing the segment.

15. The method of claim 13 further comprising:

providing a hash repository storing hashes of sent segments of data, each including at least payloads of the one or more packets relating to the web session passing through the ports; and activating a hash function on a segment of data including at least payloads of the one or more packets relating to the web session passing through the ports, giving rise to segment hash;

wherein if the segment hash is not comprised within the hash repository the web session recording enabling data includes the segment of data, and if the segment hash is comprised within the hash repository the web session recording enabling data is data enabling reconstructing the segment, wherein the data enabling reconstructing the segment is of smaller size than the segment of data.

16. The method of claim 15 wherein the data enabling reconstructing the segment is the segment hash.

17. The method of claim 15 wherein the segment of data includes at least payloads of a sequence of packets relating to a given Hypertext Transfer Protocol (HTTP) connection.

18. The method of claim 13 further comprising continuously repeating (a) and (b).

19. The method of claim 13 wherein (a) and (b) are performed by an agent installed on the web-server.

20. The method of claim 13 wherein the web session recording server and the web-server are different servers.

21. The method of claim 13 wherein the web session recording server and the web-server are a single server.

22. The method of claim 13 wherein at least two web sessions of the plurality of web sessions are conducted simultaneously.

23. The method of claim 13 wherein at least a first web session of the plurality of web sessions is initiated by a first user and at least a second web session of the plurality of web sessions is initiated by a second user, different than the first user.

24. The method of claim 23 wherein the first web session and the second web session are conducted simultaneously.

25. A non-transitory computer readable storage medium having computer readable program code embodied therewith, the computer readable program code, executable by at least one processor of a computer to perform a method comprising:

(a) monitoring one or more ports of one or more network cards comprised within a web-server, the ports being used for conducting a plurality of web sessions comprised of one or more packets having a destination address designating the web-server; and (b) sending web session recording enabling data based on the packets to a web session recording server for storing the data in a data repository thereby enabling recording the web sessions;

wherein (a) and (b) enable recording the web sessions without manipulating hardware resources external to the web-server.

* * * * *